Feb. 19, 1952     O. LAWRENZ     2,586,170
FISHING TACKLE ASSEMBLY
Filed Oct. 4, 1946
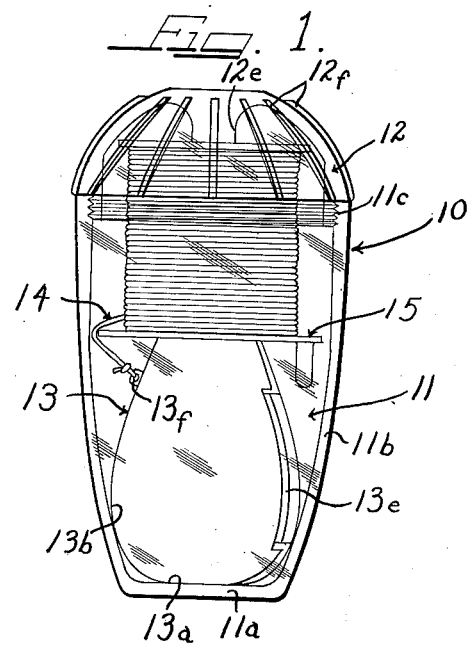
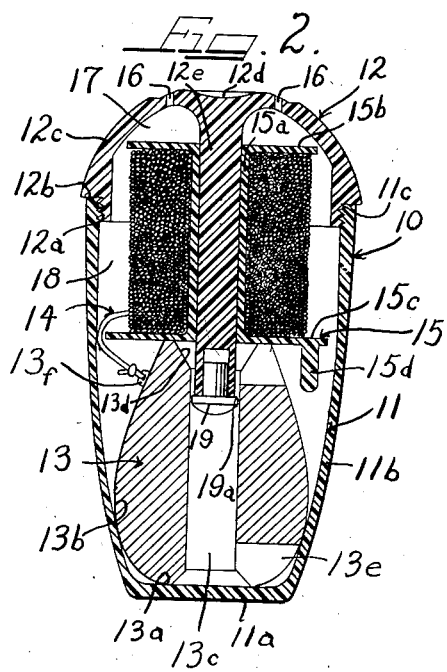
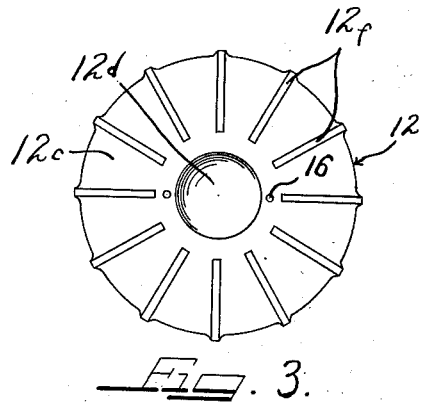
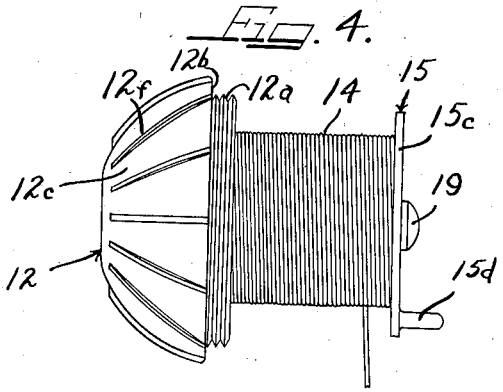
Inventor
OTTO LAWRENZ Patented Feb. 19, 1952

2,586,170

UNITED STATES PATENT OFFICE 2,586,170

FISHING TACKLE ASSEMBLY

Otto Lawrenz, Chicago, Ill., assignor to Peerless Tool & Engineering Co., Chicago, Ill., a corporation of Illinois Application October 4, 1946, Serial No. 701,231

8 Claims. (Cl. 43—43.11)

This invention relates to an assembly especially adapted for fishing tackle and including a container carrying in the interior thereof a spool or reel to receive a fish line and also arranged to snugly receive a device attached to the fish line.

Specifically the invention deals with a fish bait retriever assembly composed of a cup-shaped container, a cap for the container, a reel or spool mounted on the cap and a bait retriever snugly seatable in the container and coacting with the reel or spool.

In accordance with this invention a centrally apertured longitudinally slotted heavy weight, on the end of a line, is mounted in a cup having a cover or cap with a stem extending into the cup and into the central aperture of the weight. The cover is affixed to the cup by a tight press fit, screw threads, or by any other attaching means. When the cover is affixed to the cup, the stem holds the weight against free movement in the cup. A reel is rotatable and slidable on the stem and receives the line from the weight. This reel, when the cover is in place, has an end flange bottomed on the weight in the cup, and a second end flange in closely spaced relation to the cover so that sliding movement of the reel is impeded. When the cover is removed from the cup, the reel can slide to the free end of the stem and can freely rotate on the stem. A plug in the end of the stem provides a shoulder for retaining the reel on the stem. The cover affords a suitable gripping knob when the reel is being rotated to wind or unwind the line. The weight is adapted to be slipped on a fishing line and lowered to a snagged bait thereon whereupon the line carrying the weight is pulled and released to impact the weight against the bait for retrieving the bait.

It is, then, an object of this invention to provide a fishing tackle assembly including a container affording a housing for tackle and a spool for a line.

Another object of the invention is to provide a container for a fish bait retriever which not only snugly houses the retriever but also provides a spindle for a reel.

Another object of the invention is to provide a bait retriever including a cup shaped for snugly receiving a weight in the bottom thereof and a cap for the cup having a stem extending into the weight when the cap is fixed to the cup and a reel rotatable on the stem and held between the cover and weight.

Another object of the invention is to provide a fishing tackle assembly including a plastic cover and container coacting to afford a reel spindle and housing.

A specific object of the invention is to provide a bait and plug retriever composed of a reel and a weight with a container providing a spindle for the reel and a housing for both the reel and weight.

Other and further objects of the invention will be apparent to those skilled in the art from the following detailed description of the drawings which, by way of a preferred example only, illustrate one embodiment of the invention.

On the drawings:

Figure 1 is a side elevational view of a bait retriever assembly according to this invention.

Figure 2 is a longitudinal cross-sectional view of the assembly of Figure 1.

Figure 3 is a plan view of the cover as shown in Figures 1 and 2.

Figure 4 is a side elevational view of the cover and reel assembly removed from the container.

As shown on the drawings:

The tackle assembly 10 shown in Figures 1 and 2 is composed of a cup 11, a cap 12, a retriever weight 13, a line 14, and a reel 15. The cup 11 and cover 12 are preferably composed of transparent plastic material illustrated in Figure 1, although it should be understood that any suitable structural material, including metal, wood, leather, and the like, can be used in place of plastic.

The cup 11 has a flat bottom 11a and a side wall 11b, preferably of circular cross section, diverging outwardly from the bottom 11a. The upper end of the cup 11 has an internally threaded open mouth 11c.

The cap 12 has an externally threaded cylindrical gland portion 12a adapted to be screw-threaded into the mouth 11c of the cup 11. A shoulder 12b surrounds the gland 12a and is bottomed on the rim of the cup when the cap is threaded home.

The cap has a hollow dome 12c converging to a recessed end wall 12d. Vent holes 16 are provided in the dome 12c of the cup around the end wall 12d. This dome 12c of the cup provides a recess 17 registering with the interior 18 of the cup and increasing the storage capacity of the cup.

An integral stem 12e depends from the apex of the dome portion 12c of the cap through the recess 17 and for a considerable distance into the space 18 of the cup when the cap is mounted on the cup. This stem 12e is of circular cross section and is at the longitudinal center of the cap and cup.

The cap 12 has raised ribs 12f thereon extending along the dome wall 12c in circumferentially spaced intervals to provide projections which will form flat spots on an otherwise circular member, to prevent rotation of the member. These ribs 12f also afford gripping portions for manipulation of the cap.

The weight 13 is somewhat pear-shaped with a flat bottom wall 13a for resting on the bottom 11a of the cup and with bowed side walls 13b snugly engaging the side walls 11b of the cup adjacent the bottom 11a. The weight 13 has a cylindrical central aperture 13c therethrough with an outwardly flared mouth 13d at the top end thereof as shown in Figure 2. A slot 13e with an offset central portion extends radially through the weight 13 to communicate with the aperture 13c for quick insertion of a fish line into the aperture.

An ear 13f on the upper end of the weight receives the end of the line 14 therein.

The reel 15 is preferably composed of plastic, although it can be fabricated from any suitable structural material, and includes a hollow axial tubular portion 15a, a small circular flange 15b at one end thereof, and a larger circular flange 15c at the other end thereof carrying a handle 15d. The line 14 is wound on the tubular portion 15a between the flanges 15b and 15c.

The tubular portion 15a of the reel 15 is rotatably and slidably mounted on the stem 12e which forms a spindle for the reel. As shown in Figure 2, the stem 12e is considerably longer than the reel and projects beyond both ends thereof.

The free end of the stem is recessed and a button 19 is press fitted therein to form a shoulder 19a at the end of the stem of a size larger than the aperture through the tube 15a of the reel, so that the reel cannot drop off of the stem.

The button 19 and end of the stem fit in the aperture 13c of the weight as shown in Figure 2, and the stem thus prevents unauthorized rocking of the weight in the cup 11.

When the weight 13 is bottomed in the cup, as shown in Figures 1 and 2, its top end bottoms the flange 15c of the reel and raises the reel off of the button 19 to position its flange 15b within the recess 17 of the cap 12. The reel 15 is thus maintained partially in the dome portion of the cap and partially in the cup, to decrease the overall height of the assembly. However, when the cap 12 is removed from the cap as shown in Figure 4, the reel 15, being slidable on the stem 12, is moved against the button 19, so that it can be freely rotated to wind and unwind the line 14. In this position the reel is sufficiently removed from the recess 17 of the cap 12 so that the winding operation is not impeded by the cap. During the manipulation of the reel, the cap 12 is conveniently grasped and firmly held in the operator's hand with the ribs affording good gripping surfaces.

After use of the retriever weight 13, it is conveniently dropped into the bottom of the cup and the cover with the reel thereon is then mounted on the open mouth of the cup thereby automatically moving the free end of the stem through the beveled mouth 13d of the weight into the central aperture 13c thereby holding the weight against tilting. At the same time, the upper end of the weight slides the reel partially into the recess 17 of the cover so that its end flange 15b will be positioned in close relation to the dome wall 12c. When the cap is threaded home in the threaded mouth of the cup, the reel will have very little end play on the stem, the weight will be held by the stem against tilting, and the thrusting relationship of the reel and weight will maintain the weight on the bottom of the cup.

From the above descriptions it will therefore be understood that the invention provides a compact assembly including a combination container and reel mounting.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A bait retriever comprising in combination with a centrally apertured reel with end flanges, a centrally apertured and longitudinally slotted weight, a line wound on the reel and attached to the weight, a cup shaped to snugly receive said weight in the bottom portion thereof, and a hollow domed cap for said cup having a central stem depending from the apex of the hollow dome beyond the cap to project into the cup, said stem projecting through the reel aperture and providing a spindle for the reel, said reel being slidable on the stem to partially enter the hollow dome of the cover to engage one end flange thereof on the cover, said stem projecting beyond the other end flange of the reel when the reel is engaged against the cover, and said projecting portion of the stem extending into the central aperture of the weight to aid in holding the weight in fixed position in the cup.

2. A fishing tackle assembly comprising a cup, a cap for the open end of the cup, said cap having a recess opening toward the interior of the cup and a stem projecting from within said recess beyond the open end of the cap, a reel slidable and rotatable on the stem, means on the stem retaining the reel thereon, a line on the reel, and a member seatable in the bottom of the cup attached to said line, said member providing a support surface for said reel in said cup holding the reel partially in the recess of the cap and having a bore receiving the free end of the stem.

3. A container for a fish bait retriever composed of a reel, a line, and a recessed weight, which comprises a cup member shaped to snugly receive said weight, a cover for said cup having a stem depending centrally therefrom for receiving said reel therearound and for projecting through the reel into the recess of the weight, and a shoulder on the end of said stem serving as a stop to engage the base of said reel when the cap is removed from the cup.

4. A bait and plug retriever comprising a recessed weight adapted to be slipped on a fish line, a reel, a line connected to said weight and wound on said reel, a cap member having a stem projecting through said reel and affording a spindle for the reel, and a container cup adapted to receive said weight, reel, line, and stem with the stem projecting into partially nested relationship within the recess in the weight.

5. A fishing tackle assembly comprising a cup-shaped cap having an open end, a stem extending from within the cap and beyond the plane of the open end of the cap, a container having an open end adapted to be closed by said cap, a reel rotatable and slidable on said stem, said reel adapted to be partially disposed within the cap, and a member removably housed in said container and extending from the bottom of the container to a greater distance than the clearance between the end of the stem and the bottom of the container when the cap is assembled on the container, said member having a portion extending in assembly past the extremity portion of the stem and bearing against the adjacent end of the reel to shift the reel partially into the cap and thereby reducing the overall extent of the assembly.

6. Tackle comprising a cup-shaped cap having an open end, a stem on said cap projecting from within the cap and beyond the plane of the open end of the cap, a reel rotatable on said stem, the length of said reel being less than the length of said stem and said reel being slidable thereon into and out of the cap, and a cup closed by said cap for receiving said stem whereby an object stored in said cup can hold the reel in the cap to afford sufficient clearance for the object between the bottom of the cup and the adjacent end of the reel.

7. In combination in a fishing tackle assembly of the character described, a plug retriever weight having a bore therein, an elongated container having the weight in the lower portion thereof, a reel in the upper portion of the container and lying on the upper end of the weight, a line wound on said reel and attached to said weight, and a stem extending below said reel into said bore and acting to hold the reel and the weight against relative movement transversely to the axis of the bore and the stem.

8. In combination in a fishing tackle assembly of the character described, a container, an elongated fishing plug retriever weight housed in said container and having a longitudinal bulgingly bowed side wall engaging the opposing wall surface of the container at the maximum bulge only of the weight side wall and therefore being subject to relative lateral tilting movement in the container, the weight having a bore therein, a line attached to the weight, a reel housed in the container and having the line wound thereon, said reel resting against an end of the weight, and a stem extending from the reel into said bore and holding the weight against said tilting movement.

OTTO LAWRENZ.

REFERENCES CITED

The following references are of record in the file of this patent:

UNITED STATES PATENTS

| Number | Name | Date |
| --- | --- | --- |
| 565,030 | Quinan | Aug. 4, 1896 |
| 779,937 | Holt | Jan. 10, 1905 |
| 842,540 | Fleming | Jan. 29, 1907 |
| 1,993,974 | McVicker | Mar. 12, 1935 |
| 2,058,756 | Ayer | Oct. 27, 1936 |